(12) United States Patent
Hansen

(10) Patent No.: US 8,946,324 B2
(45) Date of Patent: Feb. 3, 2015

(54) BULK MATERIAL COVER COMPOSITIONS AND METHODS OF APPLYING

(75) Inventor: David L. Hansen, Ivins, UT (US)

(73) Assignee: LSC Environmental Products, LLC, Apalachin, NY (US)

( * ) Notice: Subject to any disclaimer, the term of this patent is extended or adjusted under 35 U.S.C. 154(b) by 190 days.

(21) Appl. No.: 13/464,688

(22) Filed: May 4, 2012

(65) Prior Publication Data

US 2012/0283361 A1 Nov. 8, 2012

Related U.S. Application Data

(60) Provisional application No. 61/482,488, filed on May 4, 2011.

(51) Int. Cl.
*C08K 3/00* (2006.01)
*B09B 5/00* (2006.01)

(52) U.S. Cl.
USPC .......................................... 524/5; 405/129.9

(58) Field of Classification Search
USPC .......................................... 524/5; 405/129.9
See application file for complete search history.

(56) References Cited

U.S. PATENT DOCUMENTS

| | | |
|---|---|---|
| 5,161,915 A | 11/1992 | Hansen |
| 5,275,508 A | 1/1994 | Hansen |
| 5,385,429 A | 1/1995 | Hansen |
| 5,399,048 A | 3/1995 | Walker |
| 5,416,251 A | 5/1995 | Lomasney et al. |
| 5,525,009 A | 6/1996 | Hansen |
| 5,975,801 A | 11/1999 | Burns, Sr. et al. |
| 6,096,373 A | 8/2000 | Nachtman et al. |
| 6,435,770 B1 | 8/2002 | Shi |
| 6,806,298 B1 | 10/2004 | Nachtman et al. |
| 7,284,930 B2 | 10/2007 | Shi et al. |
| 7,544,243 B2 | 6/2009 | Hansen et al. |
| 8,029,616 B2 | 10/2011 | Hansen et al. |
| 2007/0175361 A1* | 8/2007 | Bonney et al. ............. 106/172.1 |
| 2009/0226261 A1* | 9/2009 | Hansen et al. ............. 405/129.9 |

* cited by examiner

*Primary Examiner* — John Uselding
(74) *Attorney, Agent, or Firm* — Heslin Rothenberg Farley & Mesiti P.C.

(57) ABSTRACT

A cover material for a bulk material pile and method for applying the cover material are disclosed. The cover composition comprises liquid, cement and/or fly ash, fiber, water dispersible polymer and acid.

21 Claims, No Drawings

BULK MATERIAL COVER COMPOSITIONS AND METHODS OF APPLYING

CROSS REFERENCE TO RELATED APPLICATIONS

This application claims priority from U.S. provisional application 61/482,488, filed May 4, 2011, the entire contents of which are incorporated herein by reference.

FIELD OF THE INVENTION

This invention relates to protective coverings for bulk material piles, for example, for waste piles. Particularly, the invention relates to sprayable cover materials for waste piles that provide a durable cover that minimizes odor emission and material movement.

BACKGROUND OF THE INVENTION

During the processing or storage of waste, for instance, residential or industrial waste, the waste may be concentrated into piles, for example, within landfills, compost windrows, and sludge heaps, among others. When waste is concentrated into piles, it is often necessary to cover the waste piles to minimize the emission of odor, prevent fires, prevent the movement of the waste, and/or prevent vectors such as birds, flies, and other insects from feeding on the waste. Typically, waste piles are covered by spreading a layer of dirt over the exposed portions of the waste piles. For example, in landfills, piles of municipal solid waste are typically covered by spreading a layer of dirt on the pile. The thickness of the layer depends upon the length of time the pile is to remain covered. For example, a waste pile that is to be covered for a short period of time, for example, overnight, may require, for example, a six-inch layer. However, when it is necessary to cover a waste pile for a relatively longer period of time, a twelve-inch layer may be required. For a permanent cover generally a layer of dirt of approximately two feet or more in thickness may be required.

One problem associated with the use of soil and dirt is that large quantities are necessary to cover these waste piles. For this reason, there is a high loss of available volume for waste thereby significantly reducing the amount of waste that can be concentrated into a pile. This is particularly true in landfills where waste piles are stacked upon other waste piles having daily soil covers separating each waste pile. Since there is concern over the effective space available in existing landfills, it has become necessary to maximize the volume available for waste. One way of accomplishing this is to minimize the volume of dirt necessary for covering the waste piles or to provide a cover material that substitutes for the dirt.

Several spray-on coatings have been developed to provide an effective cover to waste piles. These include the coatings described in U.S. Pat. Nos. 5,161,915; 5,275,508; 5,385,429; 5,525,009; and 7,544,243 (the disclosures of which are incorporated by reference here in their entirety), which are marketed under the registered trademark POSI-SHELL by LSC Environmental Products, LLC of Apalachin, N.Y. These cover materials typically comprise a mixture of water, mineral binder (such as cement kiln dust, "CKD," or similar materials), and fibers (both cellulose and synthetic) that can be sprayed on to a waste pile and allowed to set to provide an effective cover. These mineral-based covers have proven to provide effective covers to landfills and other waste piles.

Other prior art cover materials, for example, those described in U.S. Pat. Nos. 5,082,500 and 5,516,830, are primarily fiber based. These fiber based cover materials also include clay and a polymer that aid in retaining the integrity of the fiber-based matrix. These prior art covers are predominantly fiber with minor amounts of clay binder. However, these fiber-based covers typically do not adhere well to low friction surfaces, for example, plastic containers, typically found in landfills, and thus their effectiveness as covering material can be significantly hampered. Since the fiber in the fiber-based covers tends to agglomerate or flocculate, it is inherently difficult to fluidize the fiber-based slurry in order to pump and spay these fiber-containing products effectively. Accordingly, these fiber-based cover materials typically require inordinately large water content to prevent agglomeration of the fibers. However, the high water content produces a slurry that does not adhere well to refuse, most notably to plastic surfaces that are common in landfills. The tendency of such fiber-based cover materials to slide off landfill material typically requires that the material be applied repeatedly and with constant vigilance during application to areas where the cover thins or gaps appear. As a result, the application of such fiber-based covers can be problematic to ensure the desired material cover. Moreover, the low solids content of such fiber-based cover materials provides a non-uniform cover that, when subjected to rain and wind, can lose its integrity.

Aspects of the present invention overcome these and other limitations of the prior art and provide an effective bulk material pile cover that can be easily applied and maintained without the limitations and disadvantages of prior art material cover materials. Aspects of the present invention provide improved adhesion to landfill materials and are easier to apply. They can be applied with minimal concern for thinning and can be spray applied quickly and easily.

SUMMARY OF ASPECTS OF THE INVENTION

The present invention provides an improved cover material and method for applying the cover material to a pile. In one aspect, the material includes fly ash, but little or no cement. In other aspects, the material includes both fly ash and cement or it may include cement but little or no fly ash. Aspects of the invention may utilize any grade of fly ash, even those grades of fly ash containing high carbon. In addition, admixtures to the fly ash and liquid, typically water, slurry may include polymers and fibers, for example, specialized polymers and fiber, which are economical and easy to mix. The resulting cover material has proven to be rain resistant, for example, even resistant to rain water erosion during application of the slurry to the pile, as well as resistive to later rainfall. The cover has a desirable flexibility and is thin, yet durable. In one aspect, the cover can be used for dust control on coal ash landfills or daily and intermediate cover on municipal solid waste landfills. Aspects of the invention have a high degree of opacity and successfully perform the functions typically desired for landfill covers, including 1) litter control; 2) odor control; 3) vector control; 4) non-flammability; and 5) scavenger control.

One embodiment of the present invention is a bulk material cover composition comprising or including at least about 50 weight percent liquid; about 1 to about 50 weight percent of cement and/or fly ash; at least some fiber; and at least some polymer; the composition is free of foaming agent. In one aspect, the liquid, for example, substantially water, may comprise at least about 60 weight percent liquid, for example, about 50 to 90 weight percent liquid or about 65 to about 85 weight percent liquid. In another aspect, the cement and/or fly ash comprises about 2 to about 40 weight percent of the composition, for example, about 5 to 35 weight percent or about 8 to about 35 weight percent of the composition. The amount of these constituents typically refer to the content of the composition prior to or during application of the composition to a pile. In one aspect, little or no cement may be used; in another aspect, little or no fly ash may be used. In another aspect, the composition may further include at least some acid, such as citric acid or acetic acid. In another aspect, the composition may further include a coloring agent.

In another aspect, the fiber may be cellulose fibers or synthetic fibers, for example, polyester fibers, such as those included in the formulation "P-100" provided by LSC Environmental Products. The polymer may be a semi-synthetic polymer, for example, a cellulosic water dispersible polymer, such as, hydroxypropyl methyl cellulose (HPMC) treated water dispersible polymer or hydroxyethylcellulose (HEC) treated water dispersible polymer.

Another embodiment of the invention is a method of providing a cover to a bulk material pile, the method comprising or including providing one of the cover compositions recited above; applying the composition onto the bulk material pile; and allowing the composition to harden to provide a cover to at least a portion of the bulk material pile.

A further aspect of the invention is a method for applying a cover to a material pile comprising or including introducing a liquid to a container, the liquid comprising at least about 50 weight percent of the cover prior to application to the pile; introducing at least some fiber to the liquid in the container; agitating the liquid and the some fiber in the container to form a first mixture; introducing at least some polymer and at least some acid to the first mixture; agitating the first mixture and at least some polymer and acid to form a second mixture; introducing at least one of cement and fly ash to the second mixture, the cement and/or fly ash comprising at least about 1 to about 50 per cent of the cover prior to application to the pile; agitating the second mixture and the cement and/or fly ash to form a third mixture; and applying, for example, spraying, the third mixture to the bulk material pile.

Another embodiment of the invention is a mixture consisting essentially of about 35 to 40 pounds of cellulosic water dispersible polymer; about 7.5 to about 15 pounds of fiber; and about 1 ounce to about 2.5 pounds of acid. This mixture consists of about 70 to about 80 weight percent of the cellulosic water dispersible polymer, about 15 to about 30 weight percent of the fiber, and about 0.1 to about 5 weight percent acid. In another embodiment, the mixture consists of about 73 to about 77 weight percent of the cellulosic water dispersible polymer, about 20 to about 24 weight percent of the fiber, and about 0.5 to about 3.0 weight percent acid. For instance, the mixture may be packaged in variously sized units, such as a 50-pound or a 500-pound bag, box or other container.

Details of these aspects of the invention, as well as further aspects of the invention, will become more readily apparent upon review of the following detailed description and the accompanying claims.

DETAILED DESCRIPTION

The cover composition for waste piles and methods in accordance with aspects of the present invention may be used to cover a variety of waste piles, for example, compost windrows, sludge heaps, and municipal solid waste piles in landfills. Aspects of the invention may also be used to cover non-waste-type material, for example, stockpiles of sand, mulch, topsoil, cement, contaminated soil, mine tailings, ash, fly ash, coal, cement clinker, or chemical or mechanical process intermediates, and the like, to protect the contents of the pile from, for example, precipitation or wind, among other things. However, in order to facilitate the description of aspects of the present invention, the following discussion will primarily refer to the present invention as it is applied to cover waste piles, for example, municipal solid waste piles in landfills. It will be apparent to those of skill in the art, that the cover composition and application process described may also be applied for other uses, for example, non-waste uses.

The composition of one aspect of the invention is listed in Table 1.

TABLE 1

Typical Content of Cover Composition Prior to Application According to One Aspect of the Invention

| Constituent | Quantity (weight percent) |
| --- | --- |
| Liquid | at least 50 |
| Cement and/or fly ash | about 1 to about 50 |
| Fibers | At least some |
| Polymer | At least some |
| Acid | At least some |

According to aspects of the invention, the liquid may be water which, for purposes of the invention, may include landfill leachate, industrial wastewater, pond water, or combinations thereof, or any other source of water that is readily available. For example, when the present invention is used to cover a landfill having a leachate stream, the leachate, treated or untreated, may be used as the source of the liquid. Though a weight percent of at least 50% (that is, prior to or during application to the pile) may be used as shown in Table 1, in one aspect, the weight percent of liquid may be at least about 55%, at least about 60%, or at least about 65%. In one aspect, the amount of liquid may range from about 50% to about 90% of the cover composition. In another aspect, the amount of liquid may range from about 65% to about 85% of the cover composition and still provide an effective cover.

As also indicated in Table 1, the cover composition typically contains cement and/or fly ash. Again, in one aspect, little or no cement may be used and the invention provides an effective material cover. In one aspect, the composition includes about 1 to about 50 weight percent of cement and/or fly ash. The cement may be Type I or Type II Portland cement, but, according to aspects of the invention, any type of cement may be used. The cement may be added to promote quicker hardening of the composition when applied to a refuse pile, for example, to prevent dislocation of the cover due to wind or precipitation.

As known in the art, "fly ash" or "flyash" is the fine particles generated during combustion that rise with the flue gases. Fly ash typically refers to the ash that is produced during combustion of coal, that is, "coal fly ash." Fly ash is typically collected by filtration equipment from the flue gases. The content of fly ash typically depends upon the type of material, for example, the type of coal, being burned, but fly ash typically includes silicon dioxide ($SiO_2$) and calcium oxide (CaO).

In one aspect of the invention, the composition may include about 2 to about 40 weight percent of cement and/or fly ash, for example, about 5 to about 35 weight percent of cement and/or fly ash. In another aspect, the composition may include about 8 to about 35 weight percent of cement and/or fly ash. Again, in one aspect, these weight percents may comprise substantially all cement while in another aspect these weight percents may comprises substantially all fly ash.

Aspects of the present invention may also include fibers, for example, fibers that are adapted to add strength and integrity to the as-hardened cover. The fibers may be natural fibers, for example, cellulosic fibers, or synthetic fibers. The fibers enhance the integrity of the composition, for example, as the composition dries, the fibers can minimize or prevent the separation or cracking of the cement and/or fly ash.

In one aspect, the fibers may be synthetic fibers. The synthetic fibers may comprise any synthetic material that is compatible with the cement and/or fly ash and the liquid. For example, the synthetic fibers may be made from a polyamide (PA), for example, nylon; a polyamide-imide; a polyethylene (PE); a polypropylene (PP); a polyester; a polytetraflouroethylene (PTFE); an acrylonitrile butadiene styrene (ABS); a polycarbonate (PC); or a vinyl, such as, polyvinylchloride (PVC), among other plastics. The synthetic fibers may be dimensioned by "denier," which is a unit expressing the mass of a fiber divided by the fiber's length. Specifically, 1 denier is equal to 1 gram per 9000 meters of length of fiber. For example, the synthetic fibers may have deniers of typically about 1.0 denier to about 5.0 denier.

In one aspect, the synthetic fibers may comprise polyester fibers, for example, 1.5 denier polyester fibers. The polyester fibers may be coated with a compound that minimizes or prevents agglomeration of the fibers (that is, promotes dispersal) in an aqueous slurry; for example, in one aspect, the fibers may be fibers marketed under the trade name P-100 coated polyester fibers by LSC Environmental Products, and described in an MSDS and marketing material provided by LSC Environmental Products (incorporated by reference herein). Though as indicated in Table 1, one aspect of the invention includes at least some synthetic fiber, the weight percent of synthetic fiber may range from about 0.01 percent to about 1 percent, for example, from about 0.1 percent to about 0.6 percent or from about 0.2 to about 0.5 percent, typically, between about 0.3 percent and about 0.4 percent synthetic fibers, by weight.

As also indicated in Table 1, the cover composition according to the present invention also includes at least some polymer. The polymer may be a semi-synthetic polymer, such as a cellulosic water dispersible semi-synthetic polymer, for example, a hydroxypropyl methyl cellulose (HPMC) treated water dispersible polymer and/or a hydroxyethylcellulose (HEC) treated water dispersible polymer, or their equivalents. The polymer should be a water dispersible cellulose-derived polymer. All water-dispersible cellulosic polymers are envisioned, but those that are cold-water dispersible (i.e. under 40° C.) are preferred. Ideally, the polymer can be dispersed by means of a paddle mixer, although under certain circumstances an eductor may be employed. Suitable polymers include methylcellulose, ethyl methyl cellulose, hydroxyethyl cellulose (HEC), hydroxypropyl cellulose, hydroxyethyl methyl cellulose, hydroxypropyl methyl cellulose (HPMC), ethyl hydroxyethyl cellulose and carboxymethyl cellulose. In some embodiments the polymer is chosen from hydroxypropyl methyl cellulose (HPMC), hydroxyethylcellulose (HEC) and mixtures thereof. The polymer may comprise about 0.1 weight percent to about 10 weight percent of the cover material, for example, prior to or during application. In one aspect, the polymer may be about 0.5 weight percent to about 5 weight percent, or about 0.8 weight percent to about 2 weight percent of the material.

Aspects of the present invention may also include an acid, for example, citric acid or vinegar. The strength of the acid should be sufficient to provide a pH of the composition of less than about 6.0, for example, a pH of between about 1.0 and about 6.0. In some instances, the pH may be between about 3.0 and about 4.0. In one aspect, the acid may comprise about 0.01 to about 0.05 weight percent of the cover material, for example, prior to or during application. The acid may also be about 0.02 to about 0.04 weight percent of the cover material. The acid may also be about 0.02 to about 0.03 weight percent of the cover material. The cover material may also include a coloring agent. In one aspect, it is preferable that the cover may be sufficiently opaque, for example, to conceal the contents of the pile, or to provide a substantially uniformly colored cover. A coloring agent may be added to the compositions listed in Table 1 to provide the desired opacity or to provide an aesthetically pleasing shade of color to the composition. In one aspect, the coloring agent may comprise any conventional coloring agent, for example, a mortar dye, for instance, TRUE-TONE® mortar dye provided by Davis Color Corporation, may be added if desired, though other coloring agents may be used. In one aspect, from about 0.01 weight percent to about 1.0 weight percent coloring agent may be added to the composition, for example, from about 0.2 to about 0.5 weight percent coloring agent may be added.

The composition of another aspect of the invention is listed below in Table 2.

TABLE 2

| INGREDIENT | MIXTURE: (WGT percent) | | |
|---|---|---|---|
| | LOW | HIGH | EXAMPLE RANGE |
| Water | 50 | 90 | 65-85 |
| P-100 Fiber (polyester) | 0.1 | 0.6 | 0.3-0.4 |
| Polymer | 0.5 | 5.0 | 0.8-2.0 |
| Portland Cement and/or Flyash | 2 | 40 | 8-35 |
| Citric Acid and/or Acetic Acid | 0.01 | 0.05 | 0.02-0.04 |
| ** Color | 0.1 | 1.0 | 0.2-0.5 |

** Optional ingredient

According to one aspect of the invention, one or more of the cover compositions listed in Table 1 or Table 2 and described above may be provided. However, other aspects of the invention include the constituents that may be mixed with the liquid and/or the cement and/or fly ash to provide the cover compositions. For example, one aspect of the invention comprises a composition that can be mixed with a liquid to provide at least a constituent of a cover composition. The composition may comprise a mixture of any two or more of the constituents listed in Table 1 or Table 2, among others, for example, without the addition of the liquid or without the addition of liquid and the synthetic fibers listed. For instance, with reference to the constituents listed in Table 1 or Table 2, one aspect of the invention may be a composition comprising cement and/or fly ash and polymer, for example, a material comprising at least 80 weight percent cement and/or fly ash, and at least some polymer, or a material comprising at least 80 weight percent cement and/or fly ash and at least synthetic fiber and at least some coloring agent.

In one aspect of the invention, a bulk material cover composition free of foaming agent is provided. This composition comprises: at least about 50 weight percent liquid; about 1 to about 50 weight percent of at least one of cement and fly ash; at least some fiber; at least some water dispersible polymer; and at least some acid. In one aspect of the invention, the composition comprises about 50 to about 90 weight percent liquid; about 2 to about 40 weight percent of at least one of cement and fly ash; about 0.1 to about 0.6 weight percent fiber; about 0.5 to about 5 weight percent water dispersible polymer; about 0.01 to about 0.05 weight percent acid; and optionally about 0.1 to 1.0 weight percent coloring agent. In another aspect of the invention, the composition comprises about 65 to about 85 weight percent liquid; about 5 to about 35 weight percent of at least one of cement and fly ash; about 0.3 to about 0.4 weight percent fiber; about 0.8 to about 2 weight percent water dispersible polymer; about 0.02 to about 0.04 weight percent acid; and optionally about 0.2 to 0.5 weight percent coloring agent. In one aspect of the invention, the liquid comprises water; the fiber comprises polyester fiber; the water dispersible polymer comprises at least one of HPMC-treated water dispersible polymer and HEC-treated water dispersible polymer; and the acid comprises at least one of citric acid and acetic acid.

The terminology "free of" foaming agent as used herein means that only ineffective or adventitious amounts of substances that would cause foaming are found in the mixture. Generally these will be less than 1% by weight in total, usually less than 0.1%, and ideally less than 0.01%. Foaming agents are commonly surfactants with hydrophilic/lipophilic balance of above 11. Typical foaming agents are anionic surfactants such as sulfonates, particularly alkyl and alkyl benzene sulfonates, and alkali metal salts of long-chain carboxylic acids. Other foaming agents are non-ionic phenolethylene oxide condensates such as nonyl and octylphenols. To produce a foamed product, the suspensions containing these agents are commonly aerated either by a sparger or by stirring with sufficient agitation to incorporate air into the mixture. All of these materials and conditions are avoided in the present invention.

In one aspect of the invention, a bulk material cover composition is provided. This composition consists essentially of: about 50 to about 90 weight percent liquid; about 2 to about 40 weight percent of at least one of cement and fly ash; about 0.1 to about 0.6 weight percent fiber; about 0.5 to about 5 weight percent water dispersible polymer; about 0.01 to about 0.05 weight percent acid; and optionally about 0.1 to about 1 percent coloring agent. In one aspect of the invention, the composition consists essentially of about 65 to about 85 weight percent liquid; about 5 to about 35 weight percent of at least one of cement and fly ash; about 0.3 to about 0.4 weight percent fiber; about 0.8 to about 2 weight percent water dispersible polymer; about 0.02 to about 0.04 weight percent acid; and optionally about 0.2 to about 0.5 percent coloring agent. In one aspect of the invention, the composition consists essentially of about 65 to about 85 weight percent water; about 5 to about 35 weight percent of at least one of cement and fly ash; about 0.3 to about 0.4 weight percent polyester fiber; about 0.8 to about 2 weight percent of water dispersible polymer, wherein said water dispersible polymer comprises at least one of HPMC-treated water dispersible polymer and HEC-treated water dispersible polymer; about 0.02 to about 0.04 weight percent of acid, wherein said acid comprises at least one of citric acid and acetic acid; and optionally about 0.2 to about 0.5 percent coloring agent.

In another embodiment, a composition is provided comprising at least some polymer, at least some fiber, and at least some acid, for example, comprising little or no liquid, cement and/or fly ash. According to this aspect of the invention, the polymer-fiber-acid composition may be provided to which the desired liquid, cement, and/or fly ash may be introduced to provide the desired cover composition. For example, according to one aspect, a composition is provided having about 70 weight percent to about 80 weight percent polymer, for example, about 73 weight percent to about 77 weight percent polymer, for example, cellulosic water dispersible polymer, such as, HPMC-treated water dispersible polymer and/or HEC-treated water dispersible polymer; about 15 weight percent to about 30 weight percent fiber, for example, about 20 weight percent to about 24 weight percent fiber, for example, polyester fiber; and about 0.1 to about 5 weight percent acid, for example, about 0.5 weight percent to about 3.0 weight percent acid, for example, crystalline citric acid or its equivalent. In one aspect, this polymer-fiber-acid composition may be provided as a dry composition, for example, to which water and cement and/or fly ash can be introduced to provide a cover composition. These aspects of the invention are marketed under the name POSI-SHELL ULTRA™ by LSC Environmental Products.

According to aspects of the invention, the constituents listed above, for example, in Table 1 or Table 2, may be mixed in any convenient fashion and applied to the material pile. For example, the method may include providing any one of the cover compositions recited above; applying the composition onto the bulk material pile; and allowing the composition to harden to provide a cover to at least a portion of the bulk material pile.

In another aspect, a method of providing a cover to a bulk material is provided. The method includes or comprises introducing a liquid to a container, for example, a tank, the liquid, for example, water, comprising at least about 50 weight percent of the cover material prior to application to the pile; introducing at least some fiber to the liquid in the container; agitating the liquid and the fiber in the container to form a first mixture; introducing at least some polymer and at least some acid to the first mixture; agitating the first mixture and the polymer and acid to form a second mixture; introducing cement and/or fly ash to the second mixture, the cement and/or fly ash comprising at least about 1 to about 50 per cent of the cover material prior to application to the pile; agitating the second mixture and the cement and/or fly-ash to form a third mixture; and applying, for example, spraying, the third mixture on to the bulk material pile. In one aspect, when the third mixture is applied the mixture produces a layer of the third mixture on the bulk material pile, the layer having a thickness, such as, a thickness of least about ⅛ inch, for example, from about ⅛ inch to about ½ inch, for instance, ¼ inch thickness. Before, during, or after introducing the fiber to the liquid in the container, at least some acid may be introduced to the container, for example, citric acid or vinegar.

The mixing time necessary to yield a mixture with the proper consistency may vary depending upon the percentage of each constituent added to the mixture. Also, weather conditions, such as, temperature and humidity, may affect the percentage of cement and/or fly ash mixed with the liquid. However, the materials may be mixed until the mixture has a thick, viscid, "milk shake" type consistency.

Once mixed, the composition may continue to be agitated, for example, slowly agitated, for instance, by means of a commercial mixing device, such as a LSC Environmental Products PSA 2000 Applicator mixer, or its equivalent. If the composition requires transport to the point of application, the mixture may be agitated during transport.

Though the size of the pile to which the composition is applied may vary broadly, applied according to aspects of the invention, municipal solid waste piles in landfills may be relatively large. Therefore, it may be necessary to cover a large area of the surface of these piles using the cover material in accordance with the present invention. According to one aspect, the cover may be distributed by an apparatus that is capable of applying the cover composition to a large area, for example, spraying on a large area, though smaller areas may also be covered with the material. For example, the area that can be covered with the composition according to aspects of the invention may vary from 100 square feet to 100 acres, more typically between about 5000 square feet and 35 acres.

In one aspect of the invention, a distribution system may be provided which is capable of mixing and applying large volumes of the composition. A typical application apparatus may include a mixing tank having an agitator into which the ingredients (that is, the constituents) of the material cover can be introduced and mixed; a pump capable of passing a high content of solid material, for example, a slurry pump; and a conduit or hose with a nozzle to distribute the pumped slurry. The capacity of the mixing tanks may range from about 500 gallons to about 5,000 gallons. Typically, the agitator and pump may be powered by a diesel or gasoline engine. The entire application apparatus may be mounted on a trailer that could be towed by a truck or other powered means. Alternatively, the application apparatus may be mounted on the bed of a truck or mounted on a track unit to be guided to different areas of, for example, a landfill. Although the cover material for waste piles may be effectively mixed and applied using application equipment, it is possible to mix the ingredients and distribute the composition to form the cover material in other types of mixing equipment which have a sufficient mixing and spraying capacity.

The composition may be applied to the material pile by conventional means, for example, by spraying with a conventional spray applicator, such as a Posi-Shell® PSA 2000™ Applicator provided by LSC Environmental Products; a Bowie ADCM Applicator; or with common commercial hydro-seeding equipment, such as, the Bowie Lancer 600 Hydromulcher, or their equivalent. The composition or mixture may be applied onto the pile surface using a motion similar to spray painting. In one aspect, the composition may be applied to the material pile whereby the wet mixture is applied in a substantially uniform layer of at least about ⅛ inch thick, for example, about ⅛ inch to about 1 inch thick, for instance, from about ⅛ inch to about ½ inch thick, for instance, ¼ inch thick.

Unlike prior art compositions, for example, compositions disclosed in U.S. Pat. Nos. 5,082,500 and 5,516,830, aspects of the present invention exhibit improved adhesion to landfill refuse, in particular, plastics, and improved cohesion to itself whereby substantially uniform coverage of the refuse may be provided. That is, contrary to prior art formulations which have exhibited poor adhesion to refuse and thus tend to "slide off" leaving the refuse exposed, the improved adhesion qualities of aspects of the invention typically minimize or prevent undesirable exposure or inconsistencies in the cover.

During or after the entire surface area of the waste pile has been covered, the material may be allowed to harden. According to aspects of the invention, when the mixture is applied it will resemble a dotty coagulant type of material which will adhere to the waste pile and cohere to itself. Typically, the material will dry and harden to resemble a stucco-type finish within 24 hours. When no cement is present in the mixture, the composition may air dry in about 8 to about 24 hours. When cement is present in the mixture, the composition may harden faster, for example, harden in about 2 to about 6 hours. When a coloring agent is provided, such as mortar dye, the aesthetic appearance of the bulk material pile may also be enhanced. For example, aspects of the invention may provide a uniform color to a refuse or other material pile, for example, that replaces an unsightly exposed waste pile.

After the waste pile has been sufficiently covered, the applicator and mixing unit may be cleaned out thoroughly when not in use so that the mixture remaining within the apparatus does not harden. Typically, water will suffice in cleaning the apparatus. For convenience, cleaning may occur directly on the landfill or other facility.

The exact percentage of each constituent (that is, liquid, cement, fly ash, fibers, etc.) used to create the composition or mixture may depend upon the weather conditions that exist during mixing and application of the cover composition. For example, at relatively higher temperatures, the amount of liquid used in the total mixture may be greater than the amount of liquid used at lower temperatures.

The hardened composition provided by aspects of the invention may form a durable cover or membrane over the bulk material pile that minimizes or prevents the emission of odor from the pile; minimizes or prevents the potential for fires; minimizes or prevents the movement of the waste, for example, due to wind or precipitation; and minimizes or prevents vectors, such as birds, flies, and other insects, from feeding on the contents of the pile. Aspects of the invention may comprise a "daily" or "interim" cover to a refuse pile, that is, a cover that is buried by new refuse after a predetermined period, for example, over night. Aspects of the invention may also be used for long-term cover of a refuse pile, for example, aspects of the invention may provide a base upon which soil may be applied and grass or other covering plants planted.

In addition, according to an aspect of the invention, areas of the cover which deteriorate, are disrupted, or exposed, for example, by the addition of further material to an existing pile, may be recovered by spraying additional composition on the deteriorated, exposed, or disrupted area.

Again, though aspects of the invention were described for illustrative purposes for use with landfill refuse, it is understood that aspects of the present invention may be applied to any accumulation or pile of material, including waste, stockpiles of sand, mulch, ash, fly ash, coal, topsoil, contaminated soil, and cement, among others.

While several aspects of the present invention have been described herein, alternative aspects may be conceived by those skilled in the art to accomplish the same or equivalent objectives. Accordingly, it is intended by the appended claims to cover all such alternative aspects as fall within the true spirit and scope of the invention.

The invention claimed is:

1. A method of providing a cover to a bulk material pile, the method comprising:
   providing a bulk material cover composition free of foaming agent comprising:
      at least about 50 weight percent water,
      about 1 to about 50 weight percent of at least one of cement and fly ash,
      at least some fiber,
      at least some cellulosic water dispersible polymer, and
      at least some acid;
   applying the composition onto the bulk material pile; and
   allowing the composition to harden to provide a cover to at least a portion of the bulk material pile,
   wherein the acid is present in an amount sufficient to maintain the pH of the cover composition between about 1.0 and about 6.0.

2. A method according to claim 1, wherein the bulk material cover composition is formed by mixing, with at least water and at least one of cement and fly ash, a dry mixture consisting essentially of:
   about 70 to about 80 weight percent cellulosic water dispersible polymer;
   about 15 to about 30 weight percent fiber; and
   about 0.1 to about 5 weight percent acid.

3. A method according to claim 2, wherein the dry mixture consists essentially of:

about 73 to about 77 weight percent cellulosic water dispersible polymer;
about 20 to about 24 weight percent fiber; and
about 0.5 to about 3.0 weight percent acid.

4. A method according to claim 1, wherein the bulk material cover composition is formed by mixing, with at least water and at least one of cement and fly ash, a dry mixture consisting essentially of:
about 35 to about 40 pounds of cellulosic water dispersible polymer;
about 7.5 to about 15 pounds of fiber; and
about 1 ounce to about 2.5 pounds of acid,
wherein the mixture consists of about 70 to about 80 weight percent of the cellulosic water dispersible polymer, about 15 to about 30 weight percent of the fiber, and about 0.1 to about 5 weight percent acid.

5. A method according to claim 1, wherein the bulk material cover composition is formed by mixing, with at least water and at least one of cement and fly ash, a dry mixture consisting essentially of:
about 36 to about 39 pounds of cellulosic water dispersible polymer;
about 10 to about 12 pounds of fiber; and
about 3 ounces to about 1.5 pounds of acid,
wherein the mixture consists of about 73 to about 77 weight percent of the cellulosic water dispersible polymer, about 20 to about 24 weight percent of the fiber, and about 0.5 to about 3.0 weight percent acid.

6. A method according to claim 1, wherein the bulk material cover composition comprises about 65 to about 85 weight percent water.

7. A method according to claim 1, wherein the bulk material cover composition comprises about 8 to about 35 weight percent of at least one of cement and fly ash.

8. The method according to claim 1, wherein the acid is present in an amount sufficient to maintain the pH of the cover composition between about 3.0 and about 4.0.

9. The method according to claim 1, wherein the acid comprises at least one of citric acid and acetic acid.

10. The method according to claim 1, wherein the cover composition comprises about 0.01 to about 0.05 weight percent acid.

11. The method according to claim 1, wherein the cover composition further comprises a coloring agent.

12. The method according to claim 1, wherein the at least some fiber comprises synthetic fiber.

13. The method according to claim 12, wherein the synthetic fiber comprises at least some polyester fiber.

14. The method according to claim 1, wherein the cover composition comprises about 0.1 to about 0.6 weight percent fiber.

15. The method according to claim 1, wherein the cellulosic water dispersible polymer comprises at least one of hydroxypropyl methyl cellulose (HPMC) treated water dispersible polymer and hydroxyethylcellulose (HEC) treated water dispersible polymer.

16. The method according to claim 1, wherein the at least some cellulosic water dispersible polymer comprises about 0.1 to about 10 weight percent polymer.

17. The method according to claim 1, wherein the at least some cellulosic water dispersible polymer comprises about 0.2 to about 2 weight percent polymer.

18. The method according to claim 1, wherein the bulk material cover composition consists essentially of:
about 50 to about 90 weight percent water;
about 2 to about 40 weight percent of at least one of cement and fly ash;
about 0.1 to about 0.6 weight percent fiber;
about 0.2 to about 5 weight percent cellulosic water dispersible polymer;
sufficient acid to maintain the pH of the solution between about 1.0 and about 6.0; and
optionally about 0.1 to about 1 percent coloring agent.

19. The method according to claim 18, wherein the bulk material cover composition consists essentially of:
about 65 to about 85 weight percent water;
about 5 to about 35 weight percent of at least one of cement and fly ash;
about 0.3 to about 0.4 weight percent fiber;
about 0.2 to about 2 weight percent cellulosic water dispersible polymer;
sufficient acid to maintain the pH of the solution between about 3.0 and about 4.0; and
optionally about 0.2 to about 0.5 percent coloring agent.

20. The method according to claim 17, wherein the bulk material cover composition consists essentially of:
about 65 to about 85 weight percent water;
about 5 to about 35 weight percent of at least one of cement and fly ash;
about 0.3 to about 0.4 weight percent polyester fiber;
about 0.2 to about 2 weight percent of water dispersible polymer, wherein said water dispersible polymer comprises at least one of HPMC-treated water dispersible polymer and HEC-treated water dispersible polymer;
sufficient acid to maintain the pH of the solution between about 3.0 and about 4.0, wherein said acid comprises at least one of citric acid and acetic acid; and
optionally about 0.2 to about 0.5 percent coloring agent.

21. The method according to claim 1, wherein the cover composition has a thickness that is about ⅛ inch to about ½ inch.

* * * * *